United States Patent [19]

Hamamoto

[11] Patent Number: 4,818,408
[45] Date of Patent: Apr. 4, 1989

[54] INTERMITTENT AERATION TYPE BIOLOGICAL TREATMENT PROCESS AND SYSTEM THEREFOR

[75] Inventor: Youichi Hamamoto, Tokyo, Japan

[73] Assignees: Nishihara Om-Tech Co., Ltd.; Nishihara Environmental Sanitation Research Corp. Ltd., both of Tokyo, Japan

[21] Appl. No.: 92,489

[22] Filed: Sep. 3, 1987

[30] Foreign Application Priority Data

Sep. 9, 1986 [JP] Japan .................................. 61-210652

[51] Int. Cl.$^4$ ................................................ C02F 3/12
[52] U.S. Cl. ..................................... 210/614; 210/96.1
[58] Field of Search ........................ 210/641, 96.1, 626

[56] References Cited

U.S. PATENT DOCUMENTS

| 3,426,899 | 2/1969 | Smith | 210/96.1 |
| 4,280,910 | 7/1981 | Baumann | 210/614 |

FOREIGN PATENT DOCUMENTS

| 53-19677 | 2/1978 | Japan | 210/614 |
| 54-42853 | 4/1979 | Japan | 210/614 |
| 57-130593 | 8/1982 | Japan | 210/614 |
| 57-144089 | 9/1982 | Japan | 210/614 |
| 60-251994 | 12/1985 | Japan | 210/614 |

*Primary Examiner*—Benoit Castel
*Attorney, Agent, or Firm*—Rodman & Rodman

[57] ABSTRACT

The present invention is concerned with an intermittent aeration type biological treatment process and system, wherein waste water is caused to flow into an aeration tank, and aeration is repeatedly stopped and started in the aeration tank to treat the waste water. Concentration values of dissolved oxygen during aeration of the waste water in the aeration tank are continuously measured by a dissolved oxygen concentration measuring device provided in the aeration tank. Deficient values of dissolved oxygen and dissolved oxygen variation values at predetermined time intervals are calculated from the values thus measured. The deficient values and variation values are integrated and processed by an oxygen requirement value calculating-integrating operation unit to calculate an oxygen requirement value for the activated sludge in the current aeration step. The necessary aeration time duration for the succeeding step is obtained from the value of this oxygen requirement value, to thereby control the operating time duration of the aeration device. By use of the process and the system, wasteful operating energy can be eliminated and satisfactory treated water can be constantly obtained.

11 Claims, 4 Drawing Sheets

INTERMITTENT AERATION TYPE BIOLOGICAL TREATMENT PROCESS AND SYSTEM THEREFOR

FIELD OF THE INVENTION

This invention relates to a process of biological treatment of waste water and a system therefor, and more particularly to an activated sludge treatment process, a contact aeration treatment process and treatment systems therefor. Furthermore, this invention is concerned with an operation control process in an intermittent aeration type activated sludge treatment process for treating waste water by alternately repeating aeration and stopping aeration of waste water in an aeration tank and an operation control unit therefor.

BACKGROUND OF THE INVENTION

There has heretofore been known an intermittent aeration type activated sludge treatment process, wherein waste water is caused to flow into an aeration tank and aeration is repeatedly stopped and started in the aeration tank, whereby the waste water is treated.

According to the conventional intermittent aeration type activated sludge treatment process, in many of the operation control processes and the operation control unit, the starting and stopping of the aeration step is repeated in predetermined intervals of time by use of a timer or the like.

However, according to this process, there is a time duration for the aeration step and a time duration for stopping the aeration step which is fixed by the timer or the like, and there is no responsiveness to fluctuations in the flow rate of influent waste water and concentration of the activated sludge. More particularly, when the flow rate of influent waste water and the concentration of the activated sludge are low, a problem of excessive aeration is caused from the aeration at a constant rate, the quality of the treated water is deteriorated, and the rate of wasteful operating energy in the aeration device is notably high. On the other hand, when the flow rate of the influent waste water and the concentration of the activated sludge are high, the aeration becomes insufficient and the quality of the treated water is deteriorated.

The present invention has as its object the solving of the above-described problems in the intermittent aeration process.

SUMMARY OF THE INVENTION

The present invention is intended to provide an intermittent aeration type biological treatment process, wherein aeration is reduced to the least amount necessary in accordance with fluctuations in the flow rate of the influent waste water and the concentration of the activated sluge can be constatly measured, and particularly, to provide an operation control process in the intermittent aeration type activated sludge treatment process and an operation control unit therefor.

DESCRIPTION OF THE PREFERRED EMBODIMENTS

More specifically, the present invention contemplates an intermittent aeration type biological treatment process, wherein waste water is caused to flow into an aeration tank, and an aeration step and the stopping of the aeration step are alternately epeated in this aeration tank to treat the waste water, wherein:

a concentration value of dissolved oxygen (hereinafter "DO") during the aeration step of the waste water in the aeration tank is continuously measured;

deficient values of dissolved oxygen and dissolved oxygen variation values at predetermined time intervals are calculated from the values thus measured, the deficient values and variations values are integrated and processed by an oxygen requirement value calculating—integrating operational unit to calculate an oxygen requirement value for the activated sludge in the current aeration step, and a necessary aeration time duration for the succeeding step is obtained from the value of this oxygen requirement value, to thereby control the aeration time durations for the succeeding step.

Furthermore, the present invention also contemplates an intermittent aeration type biological treatment system comprising: an aeration tank, into which waste water flows; an aeration device for aerating the waste water in the aeration tank; and a control unit for controlling the start and stop operation of this aeration device, wherein there are provided:

a DO measuring device disposed in the aeration tank;

an oxygen requirement value calculating—integrating operational unit connected to the DO measuring device; and the aeration device, in which a driving circuit is connected to the oxygen requirement value calculating—integrating operational unit.

According to the present invention, the aeration time duration in the aeration step is determined in accordance with the oxygen requirement value calculated from the rate of respiration of the activated sludge. Accordingly, the operation control of the aeration step in the intermittent aeration type biological treatment process according to the present invention is performed whereby the concentration of DO of a mixed liquor in the aeration tank is measured at predetermined time intervals, and the rate of respiration of the activated sludge is calculated from the difference between the concentration of DO and the concentration of saturated oxygen of the mixed liquor, and a variation value of the concentration of DO.

More specifically, according to the present invention, the value of DO in the aeration tank is continuously measured, a deficient value of DO and a variation value of DO are calculated from this value of DO to obtain the rate of respiration of the activated sludge at predetermined time intervals. Subsequently, this rate of respiration is integrated to calculate the oxygen requirement value of the activated sludge, the necessary time duration for the aeration step is calculated from the oxygen requirement value, and the aeration time duration for the aeration step is controlled on the basis of the necessary time duration for the aeration step thus calculated.

Furthermore, in the intermittent aeration type biological treatment system according to the present invention, in order to aerate the waste water which has flowed into the aeration tank, the aeration device is provided in the aeration tank. Connected to the aeration device is a control unit for controlling the start and stop operation of the aeration device to repeat the start and stop of aeration in the aeration device.

According to the present invention, with the control unit, a DO measuring device is provided in the aeration tank to measure the value of DO of the mixed liquor in the aeration tank. Furthermore, an integrating operational unit is provided, wherein a deficient value of DO and a variation value of DO are calculated from measured values of DO continuously measured by the DO measuring device. The rates of respiration of the activated sludge at predetermined time intervals are calculated, and the rates of respiration thus calculated are integrated to calculate an oxygen requirement value of the activated sludge and a necessary time duration for the aeration step, and the operation unit is controlled in accordance with the value of the necessary time duration for the aeration step.

Figure 1:
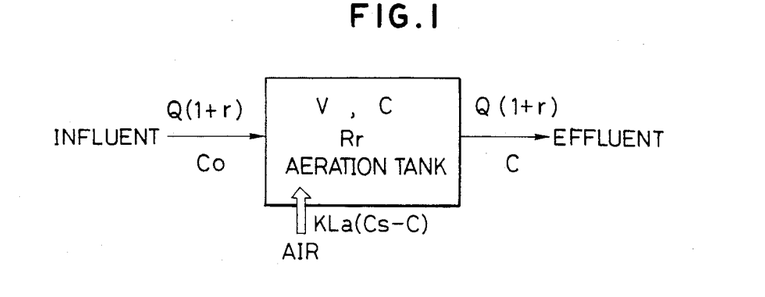
FIG. 1 is a schematic diagram showing the oxygen balance in the aeration tank.

The accompanying FIG. 1 shows the oxygen balance in the aeration tank according to the present invention.

In this FIG. 1, the oxygen balance in the aeration tank are represented by the following equation (1).

$$V \cdot \frac{d_c}{d_t} = \frac{1}{24} \cdot Q(1 + r)C_o - \frac{1}{24} \cdot Q(1 + r)C + K_{La}(C_s - C) \cdot V - R_r \cdot V \quad (1)$$

wherein
Q: is the flow rate of influent waste water into the aeration tank (m³/day),
r: is the rate of return sludge to the aeration tank (—),
V: is the volume of the aeration tank (m³),
C: is the DO concentration of mixed liquor in the aeration tank (mg/l),
$C_o$: is the DO concentration of liquor transferred to the aeration tank (mg/l),
$C_s$: is the saturated DO concentration of mixed liquor in the aeration tank (mg/l),
$R_r$: is the a rate of respiration of activated sludge in mixed liquor in the aeration tank (mg/l/H),
($d_c/d_t$): is the DO variation in mixed liquor in the aeration tank (mg/l/H), and
$K_{La}$: is the overall oxygen transfer coefficient in mixed liquor in the aeration tank (l/H).

Accordingly, rate of respiration ($R_r$) of the activated sludge in the mixed liquor in the aeration tank is represented by the following equation (2) obtained by changing the form of equation (1)

$$R_r = \frac{1}{24} \cdot \frac{Q(1 + r)}{V} \cdot (C_o - C) + K_{La}(C_s - C) - \frac{d_c}{d_t} \quad (2)$$

In the intermittent aeration type biological treatment, the values of Q, r, V and $K_{LA}$ in equation (2) are in a substantially determined relationship. For example, in waste water treatment facilities of an extended aeration process, it is known that, normally, the following values are adopted.

$Q = 0.2 Q_o - 0.8 Q_o$ ($Q_o$: design flow rate)

$r = 1-5$ $V = Q_o$ $K_{La} = 1.5-5$

The coefficient in the first term of the equation (2) is $$\frac{1}{24} \cdot \frac{Q(1 + r)}{V} = 0.008 - 0.17$$

while, the coefficient in the second term is $K_{La} = 1.5-5$.

Hence, the coefficient in the first term is 0.002–0.1 times the coefficient in the second term, so that, normally, the first term of equation (2) can be neglected by the second term. Accordingly, the rate kf respiration ($R_r$) of the activated sludge of the present invention can be normally calculated from the following equation (3).

$$R_r = K_{La}(C_s - C) - \frac{d_c}{d_t} \quad (3)$$

Since an oxygen requirement value ($O_2$) in the aeration tank is an oxygen value needed for respiration of the activated sludge during the aeration step, $O_2$ can be calculated from the following equation (4), in which the rates of respiration ($R_r$) at predetermined time intervals are integrated.

$$O_2 = V \cdot \int_O^T R_r \cdot d_t \cdot 10^{-3} \quad (4)$$

wherein
$O_2$: is the oxygen requirement value during one cycle in the intermittent aeration type activated sludge treatment process (kgO₂/cycle), and
T: is the aeration time duration in one cycle (hr/cycle).

The value of dissolved oxygen in the mixed liquor in the aeration tank, i.e. total oxygen transferred (OC) to the aeration tank can be calculated from the following equation (5).

$$OC = K_{La} \cdot C_s \cdot V \cdot 10^{-3} \quad (5)$$

where
OC: is the total oxygen transferred to the aeration tank (kgO₂/H), and
V: is the volume of the aeration tank (m³).

The necessary aeration time duration ($T_A$) during one cycle of the intermittent aeration type activated sludge treatment process can be calculated from the following equation (6).

$$T_A = \frac{O_2}{OC} \quad (6)$$

where
$T_A$: is the necessary aeration time duration for the one cycle (hr/cycle).

The overall oxygen transfer coefficient ($K_{La}$) in the aeration tank, corrected in water temperature from the fresh water state to the waste water state, can be calculated from the equation (7).

$$K_{La} = \alpha \cdot 1.024^{(t-20)} \cdot K_{La}(20) \quad (7)$$

where $\alpha: \frac{K_{La} \text{ in waste water}}{K_{La} \text{ in fresh water}} (= 0.9)(-)$ t: water temperature in mixed liquor in the aeration tank (°C.), and
$K_{La}(20)$: $K_{La}$ in fresh water at 20° C. (1/H). (Refer to W. W. Eckenfelder, Jr. and D. J. O'Connor: Biological Waste Treatment, Pergamon Press (1961), Pages 91 and 94)

Corrections of the saturated DO concentration ($C_s$) in the mixed liquor in the aeration tank in accordance with water temperature, waste water and water depth are made with equation (8).

$$C_s = \beta \times \left(1 + \frac{H}{20.66}\right) \times (14.16 - 0.3943 \times t + 0.007714 \times t^2 - 0.0000646 \times t^3) \tag{8}$$

where $\beta: \dfrac{C_s \text{ in waste water}}{C_s \text{ in fresh water}}$ (= 0.95)(—)

$H$: air diffused water depth (m)

(Refer to W. W. Eckenfelder, Jr. and D. J. O'Connor: Biological Waste Treatment, pages 76 and 77 Pergamon Press (1961).

Now, according to the present invention, the volume (V) of the aeration tank, the DO concentration (C) of the mixed liquor in the aeration tank, the saturated DO concentration ($C_s$) of the mixed liquor in the aeration tank and the overall oxygen transfer coefficient ($K_{La}$) of the mixed liquor in the aeration tank are calculated through measuring, calculating and the like, and the equations (3) to (6) are used for the oeration, whereby the necessary time duration for the aeration step is calculated and the operating time duration of the aeration device in the following aeration step is controlled, so that the aeration step of the intermittent aeration type activated sludge treatment process can be efficiently controlled.

Further, according to the present invention, if a temperature gauge is provided in the aeration tank, and the saturated DO concentration ($C_s$) of the mixed liquor in the aeration tank and the overall oxygen transfer coefficient ($K_{La}$) are corrected in temperature in accordance with the value of temperature thus measured to calculate the necessary time duration for the aeration step, then more efficient aeration control can be performed.

Furthermore, in stopping the aeration step according to the present invention, if agitation is conducted in the aeration tank, removal of biological nitrogen and phosphorus can be further facilitated.

According to the intermittent aeration type biological treatment process of the present invention, the rate of respiration of the activated sludge variable in accordance with the fluctuations in the flow rate of the waste water flowing into the aeration tank and the concentration of the activated sludge can be calculated from the DO deficient value and the variation of the DO value, which are obtainable by measuring the DO value in the aeration tank. Further, the rates of respiration at predetermined time intervals thus calculated are integrated to obtain the necessary time duration for the aeration step of the activated sludge, whereby the time duration for the following aeration step is controlled, so that, even if fluctuations occur in the flow rate of the influent waste water, the quality of the influent water, the concentration of the activated sludge and the like, the least necessary aeration step in accordance with the fluctuations can be constantly measured, differing from the conventional intermittent aeration type sludge treatment process.

Furthermore, in the intermittent aeration type activated sludge treatment system according to the present invention, the DO value in the aeration tank is automatically and continuously measured by the DO measuring device, the interim rate of respiration is calculated from the DO deficient value and the DO variation value, which are calculated on the basis of the DO value thus measured, the interim rates of respiration are integrated by an integrating operational unit, the necessary time duration for the aeration step in the current aeration step is calculated. For example, the control value of the control unit is calculated in accordance with the value of the necessary time duration for the aeration step, and the aeration time duration of the aeration device in the following aeration step is automatically controlled. Hence, even if fluctuations occur in the flow rate of the influent waste water, the quality of the influent water, the concentration of the activated sludge and the like, the least necessary aeration in accordance with the fluctuations can be automatically and efficiently measured at all times, differing from the conventional intermittent aeration type activated sludge treatment system.

Furthermore, as compared with the conventional intermittent aeration type activated sludge treatment system, in the system according to the present invention, even when the flow rate of the influent waste water and/or the concentration of the activated sludge becomes low, the aeration time duration can be shortened in accordance with the fluctuations, so that, compared with the conventional intermittent aeration system, wasteful use of operational energy can be eliminated, satisfactory treated water quality can be obtainedconstantly, and the highest energy-saving operation can be achieved. Moreover, the rate of removal of nitrogen and phosphorus can be improved.

EXAMPLE 1

A working example of the intermittent aeration type activated sludge treatment process and the system therefor according to the present invention will now be described with reference to the accompanying drawings.

However, the present invention is not restricted by the exemplification and description as illustrated below.

Figure 2:
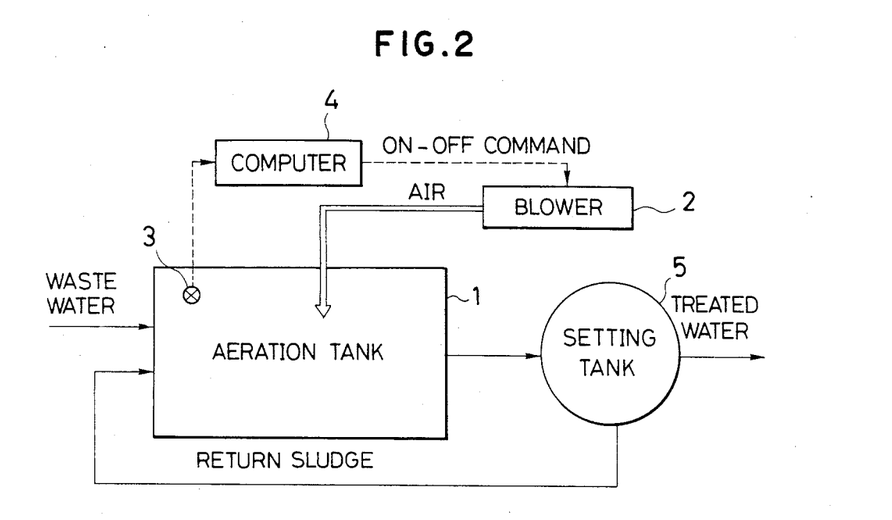
FIG. 2 is a schematic diagram showing one embodiment of the intermittent aeration type activated sludge treatment system according to the present invention.

First, an operation control unit will be described in conjunction with FIG. 2.

In this embodiment, the aeration device includes a blower 2 and a diffuser, not shown, etc., for diffusively fed air delivered from the blower 2 into the aeration tank 1. A DO measuring device includes a DO meter having a sensor 3. A microcomputer 4 includes an integrating operational unit for processing measured values of DO from the sensor 3 to calculate the rates of respiration of the activated sludge at predetermined time intervals during the aeration step, and calculating the oxygen requirement value of the activated sludge and the necessary time duration for the aeration step from the result of the aforesaid processing. The microcomputer 4 further includes an ON-OFF control device for ON-OFF operation of the blower from the result of the aforesaid calculation.

Waste water is caused to flow into the aeration tank 1, where intermittent aeration type activated sludge treatment is conducted, in which an aeration step for feeding air by driving the blower 2 and stopping the aeration step by stopping the blower 2 are alternately repeated. In this aeration treatment, DO values vary in accordance with fluctuations in the flow rate of the influent waste water and the concentration of the activated sludge are continuously measured by the sensor 3 in the aeration tank 1, and the DO value information at the predetermined time intervals thus measured is inputted into the microcomputer 4. The microcomputer 4 performs calculations on the basis of the DO value information thus inputted and outputs ON-OFF command signals and the like to the blower 2. Upon receiving this signal, the blower 2 effects the operation and the stopping of operation. In this embodiment, aeration time duration is automatically controlled under the microcomputer. Incidentally, the mixed liquor, upon completion of the intermittent aeration type activated sludge treatment in the aeration tank 1, is introduced into a settling tank 5 to be settled. Part of the sludge thus settled is returned to the aeration tank, and supernatant liquid is discharged as the treated water.

EXAMPLE 2

Figure 3:
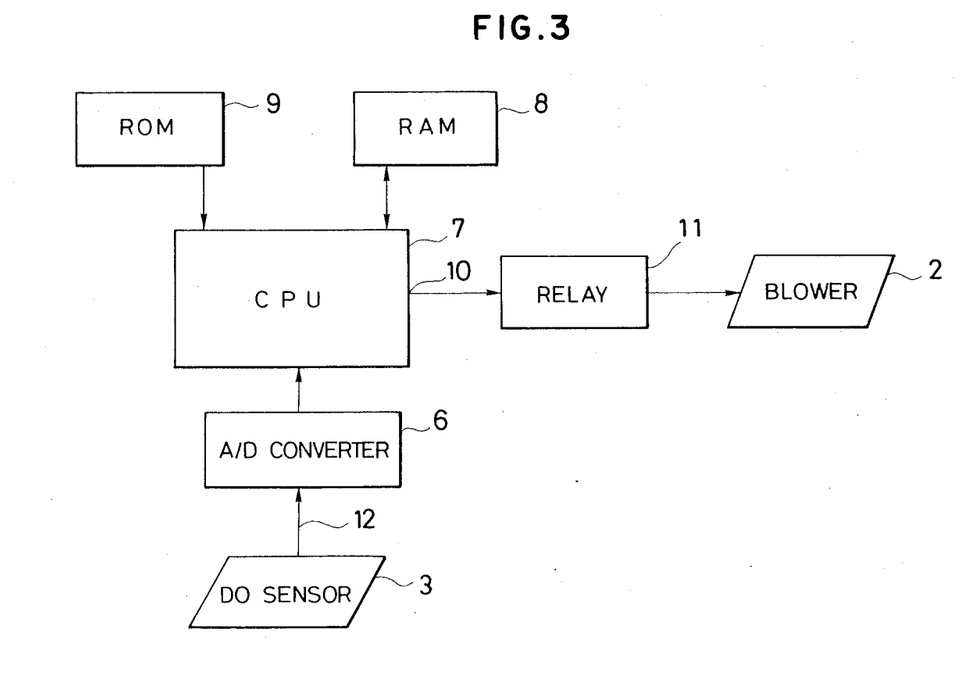
FIG. 3 is a block diagram showing a signal processing device in the embodiment shown in FIG. 2.

FIG. 3 is a schematic block diagram showing an example of a signal process control device including a microcomputer used in this embodiment.

In this example, the sensor 3 is connected to the control processing unit (CPU) 7 through fthe analog-digital (A/D) converter 6. Alternatively, the CPU 7 is connected to the random access memory (RAM) 8 and the read only memory (ROM) 9. The output terminal 10 for control of the microcomputer is connected to a power circuit of the blower 2 through the relay output control circuit 11.

The signal process control device in this example has the above-described arrangement, so that, in operating the aeration tank, the saturated DO concentration ($C_s$) of the mixed liquor in the aeration tank at a value predetermined by JIS (Japan Industrial Standard) or the like is stored in the ROM, and the overall oxygen transfer coefficient ($K_{La}$) of the mixed liquor in the aeration tank differs, depending on the facilities and values determined and stored in the RAM.

When the aeration tank is operated during one aeration step, DO concentrations (C) of the mixed liquor are continuously measured by the DO sensor 3. A DO value measuring analogue signal from the sensor 3 is delivered to the A/D converter 6 via a signal line 12, converted into a digital signal and inputted into the CPU 7. The CPU 7 receives this digital signal at predetermined time intervals, and delivers it to the RAM 8. This oeration is continuously performed during the aeration step. Upon completion of the aeration step, a program of the equation (3) stored in the ROM 9 is called out by the CPU 7, while, the respective DO values are read out of the RAM 8 for the performance. The calculated value of the rate of respiration of the activated sludge, which is processed in accordance with the program of the equation (3), is stored in the RAM 8. The programs of the equations (4), (5) and (6), which are stored in the ROM 9 are successively read by the CPU. Then, the calculated values stored in the RAM 8 are successively called out by the CPU 7, the program of the oxygen requirement value of the equation (4) and the programs of the necessary aeration time duration of the equations (5) and (6) are performed, to thereby calculate the necessary aeration time duration and deliver the same to a relay output control circuit 11. Upon receiving the command signal from the CPU 7, the relay output control circuit 11 continuously performs ON-OFF operations of the power circuit of the blower 2 until the CPU 7 delivers the succeeding signal. As described above, the blower 2 is controlled by the microcomputer, whereby the aeration time duration of the intermittent aeration step is controlled.

EXAMPLE 3

An example of the specific techniques of control according to the present invention will now be described.

(1) When the fluctuations in the influent load are low, the respective aeration steps of a plurality of cycles performed in one day are combined together, the rate of respiration is calculated by integration, the total value of oxygen requirement value per day is calculated, the total value of necessary aeration time durations per day is processed from the result of the aforesaid calculation, and the respective aeration time durations of the same cycles next day are controlled from the result of the aforesaid processing.

(2) The rae of respiration of one aeration step is integrated, the oxygen requirement value is calculated, the necessary aeration time duration is calculated from the result of the aforesaid calculation, and the time duration for the succeeding aeration step is controlled from the result of the latter calculation.

EXAMPLE 4

Figure 4:
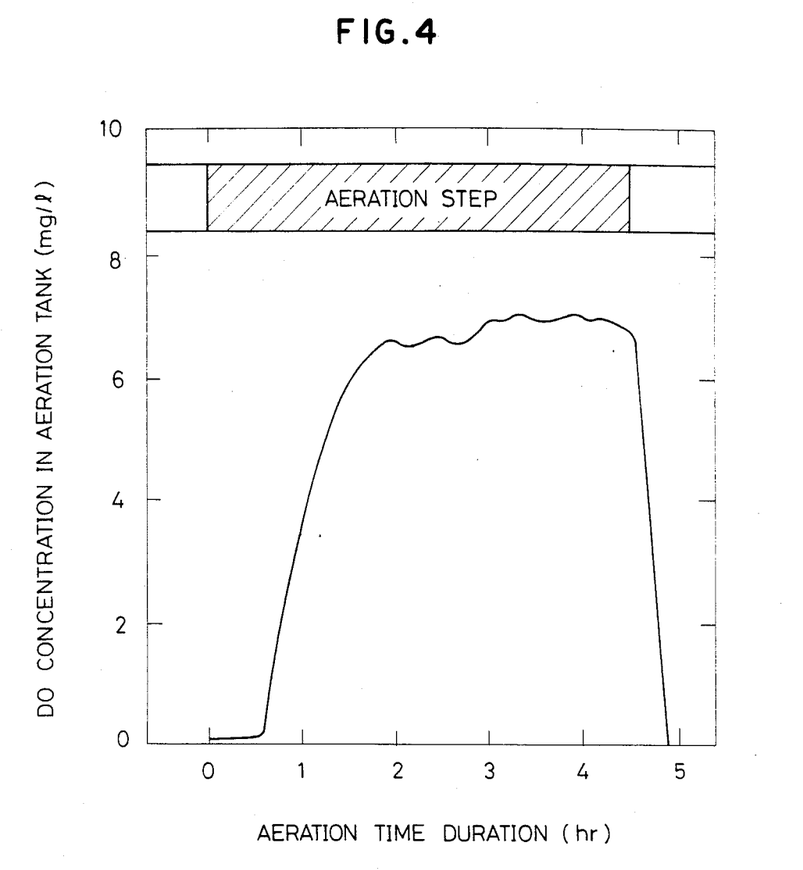
FIG. 4 is a chart showing an example of the variation of DO in the aeration tank in the embodiment shown in FIG. 2.

In Table 1, there is shown an example of the rate of respiration of the activated sludge obtained by correcting the result of processing outputted by a computer in an automatic control step in the intermittent aeration type activated sludge treatment process according to the present invention. Furthermore, FIG. 4 shows the variation of DO in the aeration tank in this example and FIG. 5 shows the variation of the rates of respiration at predetermined time intervals, which are corrected.

TABLE 1

Figure 5:
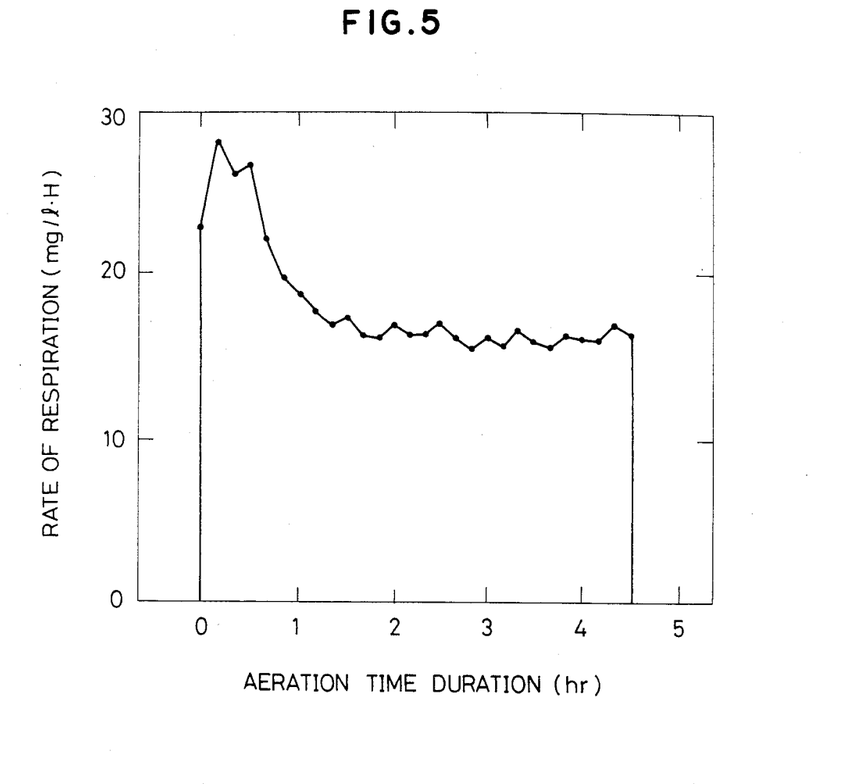
FIG. 5 is a chart showing an example of the variation of the corrected rates of respiration of the activated sludge in the embodiment shown in FIG. 2.

MEASURED VALUES OF THE RATES OF RESPIRATION IN THE INTERMITTENT AERATION TYPE ACTIVATED SLUDGE TREATMENT SYSTEM ACCORDING TO THE PRESENT INVENTION AS SHOWN IN FIG. 5

| TIME (H:M) | DO CONCENTRATION (mg/l) | RATE OF RESPIRATION (mg/l/H) |
|---|---|---|
| 00:00 | 0.00 | 23.0 |
| 00:10 | 0.06 | 28.4 |
| 00:20 | 0.14 | 26.4 |
| 00:30 | 0.24 | 26.8 |
| 00:40 | 0.16 | 22.2 |
| 00:50 | 1.64 | 19.7 |
| 01:00 | 3.22 | 18.7 |
| 01:10 | 4.32 | 17.8 |
| 01:20 | 5.14 | 16.9 |

TABLE 1-continued

MEASURED VALUES OF THE RATES OF RESPIRATION IN THE INTERMITTENT AERATION TYPE ACTIVATED SLUDGE TREATMENT SYSTEM ACCORDING TO THE PRESENT INVENTION AS SHOWN IN FIG. 5

| TIME (H:M) | DO CONCENTRATION (mg/l) | RATE OF RESPIRATION (mg/l/H) |
|---|---|---|
| 01:30 | 5.84 | 17.2 |
| 01:40 | 6.10 | 16.4 |
| 01:50 | 6.48 | 16.2 |
| 02:00 | 6.74 | 17.1 |
| 02:10 | 6.56 | 16.5 |
| 02:20 | 6.66 | 16.4 |
| 02:30 | 6.74 | 17.0 |
| 02:40 | 6.58 | 16.3 |
| 02:50 | 6.76 | 15.6 |
| 03:00 | 7.06 | 16.2 |
| 03:10 | 7.00 | 15.7 |
| 03:20 | 7.14 | 16.5 |
| 03:30 | 6.96 | 15.9 |
| 03:40 | 7.06 | 15.7 |
| 03:50 | 7.18 | 16.2 |
| 04:00 | 7.08 | 15.9 |
| 04:10 | 7.10 | 16.1 |
| 04:20 | 7.06 | 17.0 |
| 04:30 | 7.00 | — |

As the result of the above, the integrated value of the rates of respiration was 82.3 mg/l/cycle, the oxygen requirement value was 57.8 kgO$_2$/cycle and the necessary aeration time duration was 3.06 hr/cycle. In the past, the aeration time duration was operated at a fixed value at 15 hr/day. However, in this example, the aeration time duration was 7.9 hr/day at the mean value for one week.

When the automatic control according to the present invention is performed as described above, the least necessary aeration duration can be conducted at all times and the highest energy-saving operation can be performed.

Furthermore, in this example, in processing the equations (3) to (6), a water temperature gauge is provided in the aeration tank, whereby $K_{La}$ and the saturated DO concentration value ($C_s$), both of which are corrected in temperature by the water temperature value in accordance with the equations (7) and (8), are used, so that the control with further higher accuracy can be performed.

EXAMPLE 5 (COMPARATIVE)

In case of waste water discharge in a shopping center, where the volume (V) of the aeration tank: 702 (m$^3$), $K_{La}$: 2.44 (1/H) and the saturated DO concentration $C_s$: 8.44 (mg/l), in the conventional intermittent aeration type activated sludge treatment process, the aeration steps and the stopping of aeration steps were repeated six times a day, and the one aeration time duration was 2.5 hr/cycle of the fixed value.

In contrast thereto, when the intermittent aeration type activated sludge treatment process according to the present invention was applied to the aforesaid waste water discharge, the results shown in the following Table 2 were obtained.

TABLE 2

| TIME (MIN) | DO CONCENTRATION (mg/l) | RATE OF RESPIRATION (mg/l/H) |
|---|---|---|
| 1.00 | 0.05 | 23.85 |
| 2.00 | 0.01 | 20.35 |
| 3.00 | 0.03 | 19.70 |
| 4.00 | 0.06 | 21.42 |
| 5.00 | 0.06 | 20.22 |
| 6.00 | 0.08 | 24.37 |
| 7.00 | 0.03 | 20.90 |
| 8.00 | 0.04 | 22.07 |
| 9.00 | 0.03 | 22.10 |
| 10.00 | 0.02 | 17.32 |
| 11.00 | 0.09 | 23.75 |
| 12.00 | 0.05 | 20.25 |
| 13.00 | 0.07 | 22.60 |
| 14.00 | 0.05 | 20.25 |
| 15.00 | 0.07 | 21.40 |
| 16.00 | 0.07 | 10.60 |
| 17.00 | 0.25 | 23.96 |
| 18.00 | 0.20 | 24.08 |
| 19.00 | 0.15 | 23.60 |
| 20.00 | 0.11 | 21.90 |
| 21.00 | 0.10 | 20.73 |
| 22.00 | 0.11 | 19.50 |
| 23.00 | 0.14 | 14.03 |
| 24.00 | 0.26 | 18.54 |
| 25.00 | 0.30 | 13.64 |
| 26.00 | 0.42 | 18.74 |
| 27.00 | 0.45 | 20.47 |
| 28.00 | 0.45 | 16.87 |
| 29.00 | 0.51 | 17.33 |
| 30.00 | 0.56 | 17.20 |
| 31.00 | 0.61 | 14.68 |
| 32.00 | 0.70 | 17.46 |
| 33.00 | 0.74 | 14.36 |
| 34.00 | 0.83 | 14.14 |
| 35.00 | 0.92 | 15.72 |
| 36.00 | 0.98 | 15.58 |
| 37.00 | 1.04 | 15.43 |
| 38.00 | 1.10 | 15.89 |
| 39.00 | 1.15 | 13.96 |
| 40.00 | 1.23 | 16.77 |
| 41.00 | 1.26 | 16.70 |
| 42.00 | 1.29 | 13.62 |
| 43.00 | 1.37 | 14.63 |
| 44.00 | 1.43 | 15.08 |
| 45.00 | 1.48 | 16.16 |
| 46.00 | 1.51 | 14.29 |
| 47.00 | 1.57 | 11.14 |
| 48.00 | 1.68 | 18.07 |
| 49.00 | 1.67 | 12.69 |
| 50.00 | 1.75 | 15.50 |
| 51.00 | 1.78 | 13.63 |
| 52.00 | 1.84 | 15.28 |
| 53.00 | 1.87 | 15.21 |
| 54.00 | 1.90 | 12.73 |
| 55.00 | 1.97 | 13.76 |
| 56.00 | 2.02 | 15.44 |
| 57.00 | 2.04 | 11.19 |
| 58.00 | 2.13 | 14.57 |
| 59.00 | 2.16 | 12.10 |
| 60.00 | 2.23 | 10.73 |
| 61.00 | 2.32 | 14.11 |
| 62.00 | 2.35 | 12.84 |
| 63.00 | 2.40 | 12.71 |
| 64.00 | 2.45 | 15.59 |
| 65.00 | 2.45 | 11.39 |
| 66.00 | 2.52 | 11.82 |
| 67.00 | 2.58 | 14.67 |
| 68.00 | 2.59 | 12.25 |
| 69.00 | 2.64 | 15.13 |
| 70.00 | 2.64 | 14.53 |
| 71.00 | 2.65 | 11.50 |
| 72.00 | 2.71 | 12.56 |
| 73.00 | 2.75 | 14.86 |
| 74.00 | 2.75 | 13.06 |
| 75.00 | 2.78 | 14.79 |
| 76.00 | 2.78 | 13.59 |
| 77.00 | 2.80 | 16.54 |
| 78.00 | 2.77 | 11.81 |
| 79.00 | 2.82 | 14.09 |
| 80.00 | 2.83 | 11.66 |
| 81.00 | 2.88 | 18.74 |
| 82.00 | 2.81 | 12.91 |

TABLE 2-continued

| TIME (MIN) | DO CONCENTRATION (mg/l) | RATE OF RESPIRATION (mg/l/H) |
|---|---|---|
| 83.00 | 2.84 | 14.64 |
| 84.00 | 2.84 | 17.64 |
| 85.00 | 2.79 | 12.96 |
| 86.00 | 2.82 | 14.69 |
| 87.00 | 2.82 | 12.89 |
| 88.00 | 2.85 | 12.82 |
| 89.00 | 2.88 | 14.54 |
| 90.00 | 2.88 | |

The results of calculations by the computer in accordance with the equations (3) to (6) from the values shown in Table 2 indicated the integrated value of the rates of respiration of 24.0 (mg/l/cycle) and the oxygen requirement value of 16.8 (kgO₂/cycle). Accordingly, in this example, the necessary aeration time duration became 1.11 (hr/cycle), and the necessary aeration time duration of 1.11 hr/cycle was adopted.

In this example, the water temperature gauge was provided in the aeration tank and DO gauges for measuring DO of the waste water flowing into the aeration tank and the sludge to be returned, and devices for measuring the flow rate of influent waste water and the flow rate of sludge to be returned were provided in a preceding stage equipment connected to the aeration tank, whereby the water temperature (t) of the mixed liquor in the aeration tank, the flow rate (Q) of the waste water flowing into the aeration tank, the rate (r) of the sludge returned to the aeration tank, the DO concentration ($C_o$) of the liquid transferred to the aeration tank and the air diffused water depth (H) were measured.

The results are shown in the following Table 3.

TABLE 3

| | |
|---|---|
| WATER TEMPERATURE OF THE MIXED LIQUOR IN THE AERATION TANK | t = 22.0 (°C.) |
| FLOW RATE OF WASTE WATER FLOWING INTO THE AERATION TANK | Q = 321 (m³/day) |
| RATE OF THE SLUDGE RETURNED TO THE AERATION TANK | r = 1.0 (—) |
| DO CONCENTRATION OF LIQUID TRANSFERRED TO THE AERATION TANK | $C_o$ = 1.0 (mg/l) |
| AIR DIFFUSED WATER DEPTH | H = 3.5 (m) |

The necessary aeration time duration calculated from the values shown in Table 3 in accordance with the equations (2) to (8) was 1.13 hr/cycle. The result was satisfactory.

One embodiment of the present invention has been described hereinabove. Various effective modifications are obtainable on the basis of the present invention. For example, in the above embodiment, only the activated sludge treatment process, wherein the settling tank is separately provided, has been described. However, the present invention need not necessarily be limited to this, and the present invention can be applied to a cyclic activated sludge treatment process, wherein settling also occurs in the aeration tank, an oxidation ditch process and a contact aeration process, wherein contact filtering media is provided in the aeration tank.

Furthermore, present invention can be used as a respiration gauge of the activated sludge, as the rates of respiration of the activated sludge are measured at predetermined time intervals during the aeration step in the process of the automatic control.

What is claimed is:

1. An intermittent aeration process for the biological treatment of waste water, comprising:
   (a) contacting influent waste water and activated sludge in an aeration tank wherein the mixture of waste water and activated sludge forms a mixed liquor that undergoes intermittent aeration, wherein the aeration step and the cessation of aeration are alternately repeated; and wherein the duration of the aeration step is determined by
   (b) continuously measuring the concentration of the dissolved oxygen value of the liquor during the aeration step and calculating the values of deficient dissolved oxygen and the dissolved oxygen variation at predetermined time intervals;
   (c) integrating and processing the values of deficient dissolved oxygen and the dissolved oxygen variation by an oxygen requirement value calculating-integrating operational unit to calculate an oxygen requirement value for the activated sludge in the current aeration step, and the necessary aeration time duration for the next succeeding step to thereby control the aeration for the next succeeding step.

2. The process of claim 1, wherein the aeration time duration is determined from the oxygen requirement value calculated from the rate of respiration of the activated sludge.

3. The process of claim 2, wherein the rate of respiration of the activated sludge is calculated from the difference between the concentration of dissolved oxygen and the concentration of saturated oxygen of the mixed liquor and a variation value of the concentration of dissolved oxygen.

4. The process of claim 3, wherein the variable rate of respiration of the activated sludge fluctuating in accordance with the flow rate of influent waste water is calculated to provide the minimum necessary aeration.

5. The process of claim 3, wherein the oxygen requirement value-integrating operational unit comprises a microcomputer, with a device to control aeration.

6. The process of claim 3, wherein the mixed liquor, upon completion of the intermittent aeration activated sludge treatment, is introduced into a settling tank, wherein a portion of the settled sludge is recycled to the aeration treatment and the supernatant liquid is discharged as treated water.

7. The process of claim 3, wherein the predetermined time intervals vary from about 1 to 10 minutes.

8. An intermittent aeration type biological treatment system comprising:
   (a) an aeration tank with an inlet into which influent waste water flows and an outlet for effluent treated waste water;
   (b) said aeration tank housing an aeration device for aerating the waste water in the aeration tank;
   (c) a control unit for controlling the operative starting and stopping of said aeration device;
   (d) a dissolved oxygen measuring device disposed in said aeration tank;
   (e) an oxygen requirement value calculating-integrating operational unit mounted upon said dissolved oxygen measuring device; and
   (f) a driving circuit connected to said oxygen requirement value calculating-integrating operational unit and said aeration device.

9. The system of claim 8, wherein the aeration device includes a blower and a diffuser.

10. The system of claim 8, wherein the integrating-operational unit comprises a microcomputer.

11. The system of claim 10, wherein the microcomputer includes an on-off control device to operate the blower.

* * * * *

UNITED STATES PATENT AND TRADEMARK OFFICE
CERTIFICATE OF CORRECTION

PATENT NO. : 4,818,408

DATED : April 4, 1989

INVENTOR(S) : Youichi Hamamoto

It is certified that error appears in the above-identified patent and that said Letters Patent is hereby corrected as shown below:

In Abstract,
    line 14, change "operation" to --operational--.

At column 1,
    line 67, change "epeated" to --repeated--.

At column 2,
    line 17, change "tank, into" to --tank into--.

At column 4,
    line 5, change "kf" to --of--.

At column 5,
    line 32, change "oeration" to --operation--.

At column 6,
    lines 34 and 35, change "obtainedconstantly" to --obtained constantly--.

At column 7,
    line 28, change "under" to --by--.

At column 8,
    line 36, change "rae" to --rate--.

At column 9,
    line 52, change "8.44" to --8.84--.

At column 12,
    line 30, change "claim 3" to --claim 1--.

UNITED STATES PATENT AND TRADEMARK OFFICE
CERTIFICATE OF CORRECTION

PATENT NO. : 4,818,408
DATED : April 4, 1989
INVENTOR(S) : Youichi Hamamoto

It is certified that error appears in the above-identified patent and that said Letters Patent is hereby corrected as shown below:

At column 12,
 line 34, change "claim 3" to --claim 1--.

At column 12,
 line 37, change "claim 3" to --claim 1--.

At column 12,
 line 43, change "claim 3" to --claim 1--.

Signed and Sealed this

Twenty-first Day of November, 1989

*Attest:*

JEFFREY M. SAMUELS

*Attesting Officer*  *Acting Commissioner of Patents and Trademarks*